Dec. 20, 1960 P. E. SERDAR 2,965,496
FOOD PACKAGE
Filed Feb. 27, 1959 2 Sheets-Sheet 1
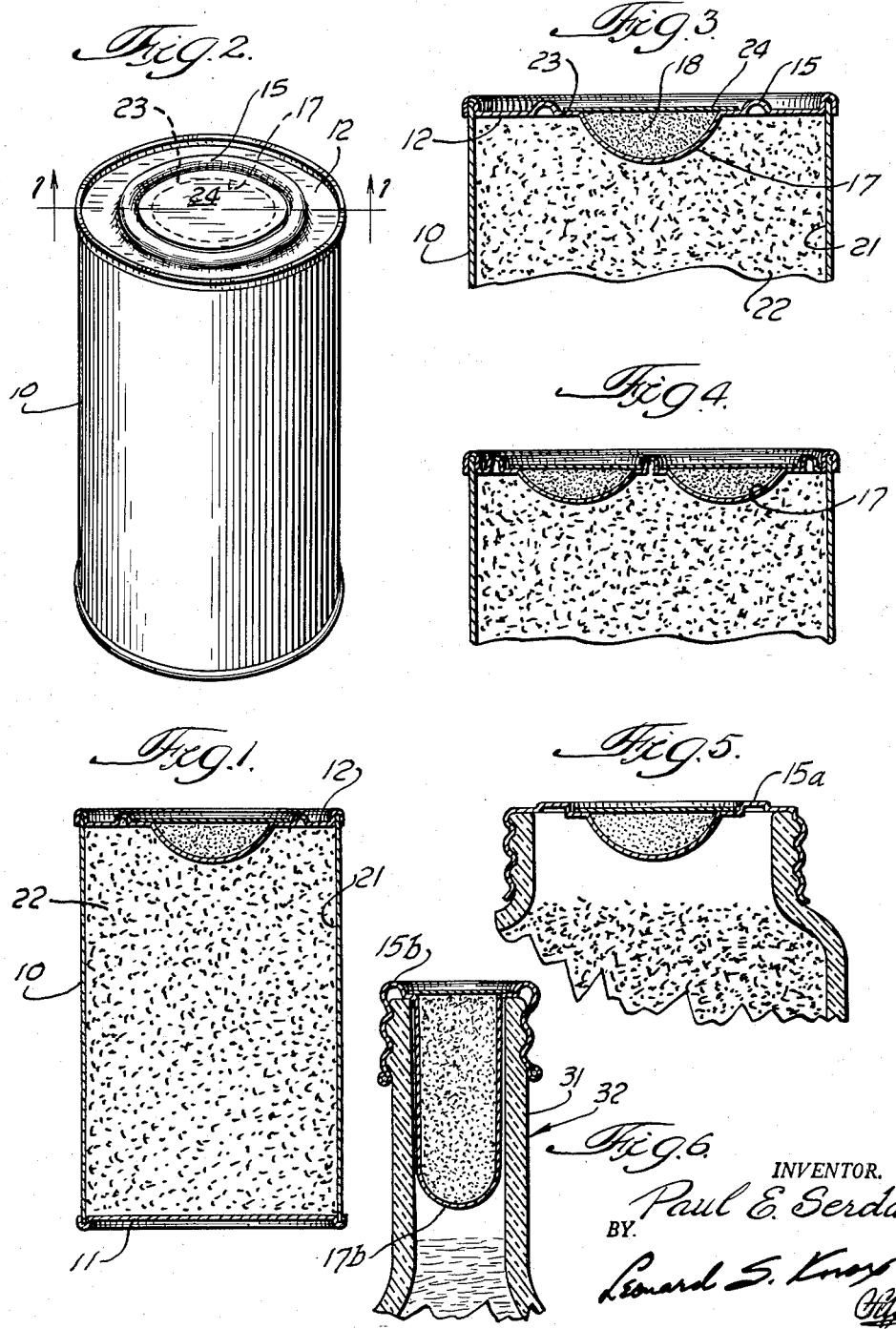

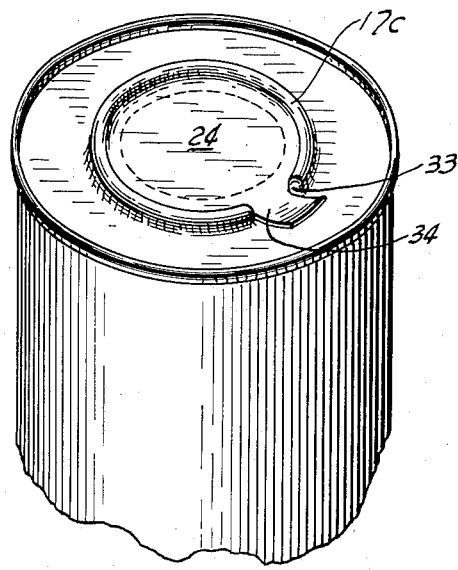
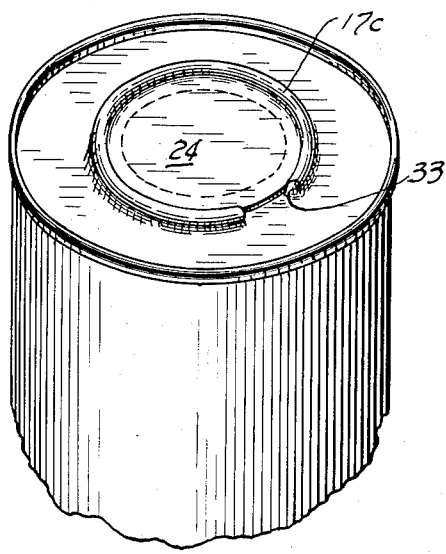

United States Patent Office 2,965,496
Patented Dec. 20, 1960

2,965,496

FOOD PACKAGE

Paul E. Serdar, Wadsworth, Ill.

Filed Feb. 27, 1959, Ser. No. 796,077

2 Claims. (Cl. 99—171)

This invention relates to a food product which consists of a principal part and an additive which are contained separately in isolated compartments of a common receptacle before consumption and are combined at the time of consumption. The invention also has reference to the container per se.

In the feeding of cooked, canned meat to animals, e.g. dogs, the beneficial effects of additives such as vitamins, minerals and mineral compounds cannot be availed of since the temperature to which the contents of the can is subjected for cooking vitiates the beneficial effects of nearly all the vitamins and mineral compounds customarily added. Moreover certain preservative compounds added to the meat are incompatible with many of the ingredients of the additive.

Accordingly a principal object of my invention is to provide a food product and an additive therefor in the form of a common container unit wherein the principal component of the product is segregated from the additive from the time of manufacture until the time of consumption, at which time the necessary admixture is effected.

Another object is to provide a container and contents as contemplated in the preceding paragraph wherein the principal component is meat which is canned in a primary compartment of the container, thereafter cooked and, following cooking and sealing, an additive such as a mixture of vitamins, mineral and/or mineral compounds, is placed in a subsidiary compartment formed on the exterior of the container which is then closed by an easily removed seal.

A further object is to provide a receptacle in accordance with the foregoing which has a primary compartment for containing the principal or bulk product, one wall of this compartment or a removable closure therefor being provided with a secondary compartment in the form of a cavity or depression for receiving the secondary material or additive.

An additional object is to provide a receptacle as aforementioned wherein the secondary compartment, following deposit of the contents therein is hermetically sealed by an adhesively secured thin film which is easily torn or stripped without the use of an implement.

Still another object is to provide a receptacle as aforesaid wherein the secondary compartment is circumscribed by a ridge extending outwardly thereof and within the confines of which there is provided a narrow, flat surface for adhesive securement of the sealing film and which ridge protects the more or less discerptible seal against injury during transportation and other handling of the receptacle.

Other objects and advantages of the invention will become apparent from the ensuing description which, taken with the accompanying drawing, disclose certain preferred forms which the invention may assume in practice.

In this drawing:

Fig. 1 is a vertical, medial cross section taken on the line 1—1 of Fig. 2 of a container and contents in accordance with the invention;

Fig. 2 is a perspective view of the exterior of the container and contents of Fig. 1;

Fig. 3 is a portion of Fig. 1 on an enlarged scale;

Fig. 4 is a view similar to that of Fig. 3 showing an alternative form of the invention including a plurality of secondary compartments;

Fig. 5 is a partial, vertical, medial cross section of another form of the invention as applied to a wide-mouthed receptacle;

Fig. 6 is a partial, vertical medial cross section of a modified embodiment of the invention as applied to a narrow-mouthed receptacle; and Figs. 7 and 8 show further alternative forms of the invention.

Briefly regarded, the invention comprehends a receptacle comprising two spaces, for convenience referred to sometimes as a primary compartment and a secondary compartment. The primary compartment which, in general, is of somewhat larger capacity than the secondary compartment, receives the principal part of the food product, e.g. in the case of a canine food, chopped or ground parts of edible animal flesh with perhaps cereal products added. In the case of a can of dog food, the same will be filled to some predetermined weight, subjected to heat and thereafter sealed. Following such stage in the manufacture a quantity of vitamins, minerals and/or mineral compounds having a predetermined relation to the quantity of main product is deposited in the secondary compartment. This latter is preferably a depressed portion of the upper end wall of the can. A seal of thin, tenacious film is placed over the depression and its contents and adhesively secured to an annular plateau forming the margin of the depression. The adhesive is desirably one which is pressure sensitive in order that the seal may be removed in its entirety following opening of the container and all or part of the additive blended with the principal product. If all thereof is not used at one time then only a proportionate part of the additive will be used whereupon the remainder may be kept in reserve by re-application of the seal. The invention also comprehends the provision of a ridge, e.g. an annular ridge outstanding from the top wall of the container and circumscribing the annular plateau just referred to, whereby the seal is protected against tearing or puncture from the time of application thereof until the container is in the consumer's hands. In an alternative aspect the seal may be provided with a marginal tab absent the adhesive for facilitating removal thereof and, desirably, such tab is located in an interruption in the rib in order that the tab may also be protected against injury. In still another aspect the rib may be interrupted and the marginal tab seal omitted. Thus a knife or its equivalent e.g. a finger nail may have easier access for removal of the seal.

Referring now to the drawing (Figs. 1 to 3) I have shown, by way of example, a container of the general form currently employed for canned dog food. Essentially the same is cylindrical and includes a lateral wall 10, a bottom wall 11 and a top wall 12 all secured together by any of several well-known methods. The end seams have been conventionalized in the drawing and the longitudinal seam has been omitted as not being essential to an understanding of the invention.

The top wall 12 is provided with an annular ridge 15 outstanding from said wall and having a mean diameter substantially half of the diameter of said wall. Although the cross section of the ridge regarded transversely is shown as substantially semi-circular, other cross sections may be availed of to accomplish the desired function as will become clear in what follows.

Centrally of the ridge 15 the top wall 12 is depressed to form the secondary compartment 17, preferably having the form of a spherical segment in order that the additive 18 may be readily scooped out with the fingers. The spaces defined between the lateral wall and top and bottom walls, referred to as the primary compartment, is indicated by the numeral 21 and receives the main product, e.g. chopped or ground meat 22. The cavity 17 has an upper dimension so selected with respect to the corresponding dimension of the ridge 15 as to define an annular plateau 23 to which a seal 24 is adhesively secured to close the cavity 17. The seal is thin and of tenacious material, preferably transparent, e.g. Mylar or cellophane. Preferably the adhesive employed is of the pressure sensitive type to permit a limited number of detachments and re-attachments of the seal as would be the case when the additive must be mixed with the main product 22 in portions.

From the foregoing it will have become evident that the ridge 15 will effectively protect the seal 24 from impingement by the lower rim or seam of another container which may be stacked thereon as the diameter and height of the ridge will be so selected as to prevent the rim of the upper container of known diameter from entering the space defined by the rim and impinging upon the seal, based on the assumption that the upper container may cant from the vertical.

In Fig. 4 I have shown an embodiment in which two or more cavities 17 may be provided when more than one additive is included, and the prior combining of the several additives may result in an adverse effect of one upon the other. Details will be apparent from the drawing. In the case of multiple cavities the same may be of different volumes and spaced apart on the upper wall in any permissible arrangement.

Fig. 5 shows another alternative in which the secondary cavity may be provided in a screw or other type of removable receptacle closure. In this figure the ridge 15a is shown flat-topped but the function is the same as outlined above.

The alternative of Fig. 6 is similar in many respects to the embodiments heretofore detailed except that here the ridge 15b is located at the margin of a screw or other type of closure of comparatively small diameter and, since the cavity 17b must suffer some reduction in diameter in order to be received within the neck 31 of a bottle 32 the depth of the cavity is correspondingly elongated. This form of the invention would be suited to the separate containment of an additive, such as hot sauce, intended for admixture with a basic, mild ketchup or other condiment and in accordance with the consumer's taste.

Another variant is illustrated in Fig. 7 wherein the ridge 17c is interrupted at 33 and the seal 24 is provided with a radially-extending tab 34 which is not adherent to the top wall 12. Thus, by grasping the tab the seal is more easily detached since it is not required that a finger nail or knife be inserted under the seal with possible tearing thereof. However, the configuration of the seal of Fig. 7 may be slightly more costly.

The embodiment of Fig. 8 is provided with an interrupted rib as in Fig. 7 but the seal is circular. Thus a clearance space is provided for more ready access for stripping of the seal.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. In a receptacle containing a perishable food product with which there is associated a mass of additive having a proclivity to become vitiated under heating and adapted to be mixed with the product at the time of consumption thereof which comprises a lateral wall and a bottom wall joined thereto defining a space for receiving the product and a generally flat, top closure for said space, the closure and lateral wall being seamed and joined for hermetic sealing of the product, the improvement which comprises: means integral with said closure defining a depression therein accessible outwardly of said closure in which the additive is retained pending use thereof, said depression lying below the general plane of the closure; a thin, flexible, tenacious film constituting a seal for said depression; the portion of the closure surrounding the depression being an annular, flat surface to provide a seat for application of the seal whereupon the seal establishes hermetic sealing of the additive pending use thereof; said closure having an outwardly protruding ridge intermediate its periphery and said annular surface circumscribing said annular surface to form a guard about said seal protecting the same against inadvertent tearing and dislodgment pending use of the additive, said ridge being spaced radially inwardly of the periphery of the closure to define a second annular area for penetration by a conventional can-opener.

2. The improvement in accordance with claim 1 further characterized in that the seamed joint between the lateral wall and closure is constituted as an upwardly-extending rim peripherally of the closure and said ridge is below the plane defined by the upper edge of the rim.

References Cited in the file of this patent

UNITED STATES PATENTS

| | | |
|---|---|---|
| 814,503 | Andreson | Mar. 6, 1906 |
| 832,168 | Schopflocher | Oct. 2, 1906 |
| 1,474,248 | English | Nov. 13, 1923 |
| 1,616,665 | Murch | Feb. 8, 1927 |
| 2,230,747 | Greene | Feb. 4, 1941 |
| 2,317,882 | Boesel | Apr. 27, 1943 |
| 2,824,010 | Pedersen | Feb. 18, 1958 |
| 2,863,778 | Lynn | Dec. 9, 1958 |

FOREIGN PATENTS

| | | |
|---|---|---|
| 716,477 | France | Oct. 6, 1931 |